(12) United States Patent
Ward

(10) Patent No.: US 9,277,352 B1
(45) Date of Patent: Mar. 1, 2016

(54) MOBILE DISTRIBUTED MEMORY SYSTEMS

(71) Applicant: Amazon Technologies, Inc., Reno, NV (US)

(72) Inventor: Miles Julian Ward, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 452 days.

(21) Appl. No.: 13/741,215

(22) Filed: Jan. 14, 2013

(51) Int. Cl.
*H04W 4/02* (2009.01)
*H04L 29/08* (2006.01)
*H04W 4/18* (2009.01)

(52) U.S. Cl.
CPC .................. *H04W 4/02* (2013.01); *H04L 67/02* (2013.01); *H04L 67/18* (2013.01); *H04W 4/021* (2013.01); *H04W 4/18* (2013.01)

(58) Field of Classification Search
CPC ......... H04W 4/02; H04W 4/021; H04W 4/04; H04W 4/14; H04L 67/02; H04L 67/04; H04L 67/18; H04L 16/20
See application file for complete search history.

(56) References Cited

U.S. PATENT DOCUMENTS

| 5,794,164 A * | 8/1998 | Beckert et al. ............... 455/3.06 |
| 7,356,389 B2 * | 4/2008 | Holst et al. ........................ 701/3 |
| 8,392,262 B2 * | 3/2013 | Mallick .................. G06Q 30/06 705/26.1 |
| 8,447,332 B2 * | 5/2013 | Weinreich ............. H04W 4/025 370/338 |
| 8,868,288 B2 * | 10/2014 | Plante et al. ................. 701/32.2 |
| 8,996,240 B2 * | 3/2015 | Plante .......................... 701/33.4 |
| 2005/0197748 A1 * | 9/2005 | Holst et al. ........................ 701/3 |
| 2009/0275348 A1 * | 11/2009 | Weinreich ............. H04W 4/025 455/456.3 |
| 2009/0276589 A1 * | 11/2009 | Mylaraswamy ........ H04L 67/18 711/162 |
| 2014/0343756 A1 * | 11/2014 | Nefcy ................. B60W 10/023 701/2 |

\* cited by examiner

*Primary Examiner* — Ramy M Osman
(74) *Attorney, Agent, or Firm* — Lee & Hayes, PLLC

(57) ABSTRACT

Data may be managed by a mobile data management system. The system may receive data intended for a web service system location at a first location from an external source located at a second location. In some aspects, the data may be received via an application programming interface. The system may also cause storage of the received data in at least one memory while the system is at the second location. The system may further provide the received data to the web service system while at the first location.

24 Claims, 6 Drawing Sheets

MOBILE DISTRIBUTED MEMORY SYSTEMS

BACKGROUND

With the growth of cloud computing, websites and other web services that manage user data have become ubiquitous. Such sites and/or services may provide various ways for users to interact with otherwise provide the data to be managed. For example, different upload, download, processing, storage, and/or management options may be provided to the users. These sites and/or services may also provide the ability for user's to manage uploading such data from multiple different locations and/or device types. In some cases, one or more application programming interface (API) method calls may be provided to facilitate the upload, storage, and/or management of such user data. However, providing such data management options, especially for large amounts of data and/or data collected at remote locations, may pose challenges to the service providers and/or the users.

BRIEF DESCRIPTION OF THE DRAWINGS

Various embodiments in accordance with the present disclosure will be described with reference to the drawings, in which.

DETAILED DESCRIPTION

Figure 1:
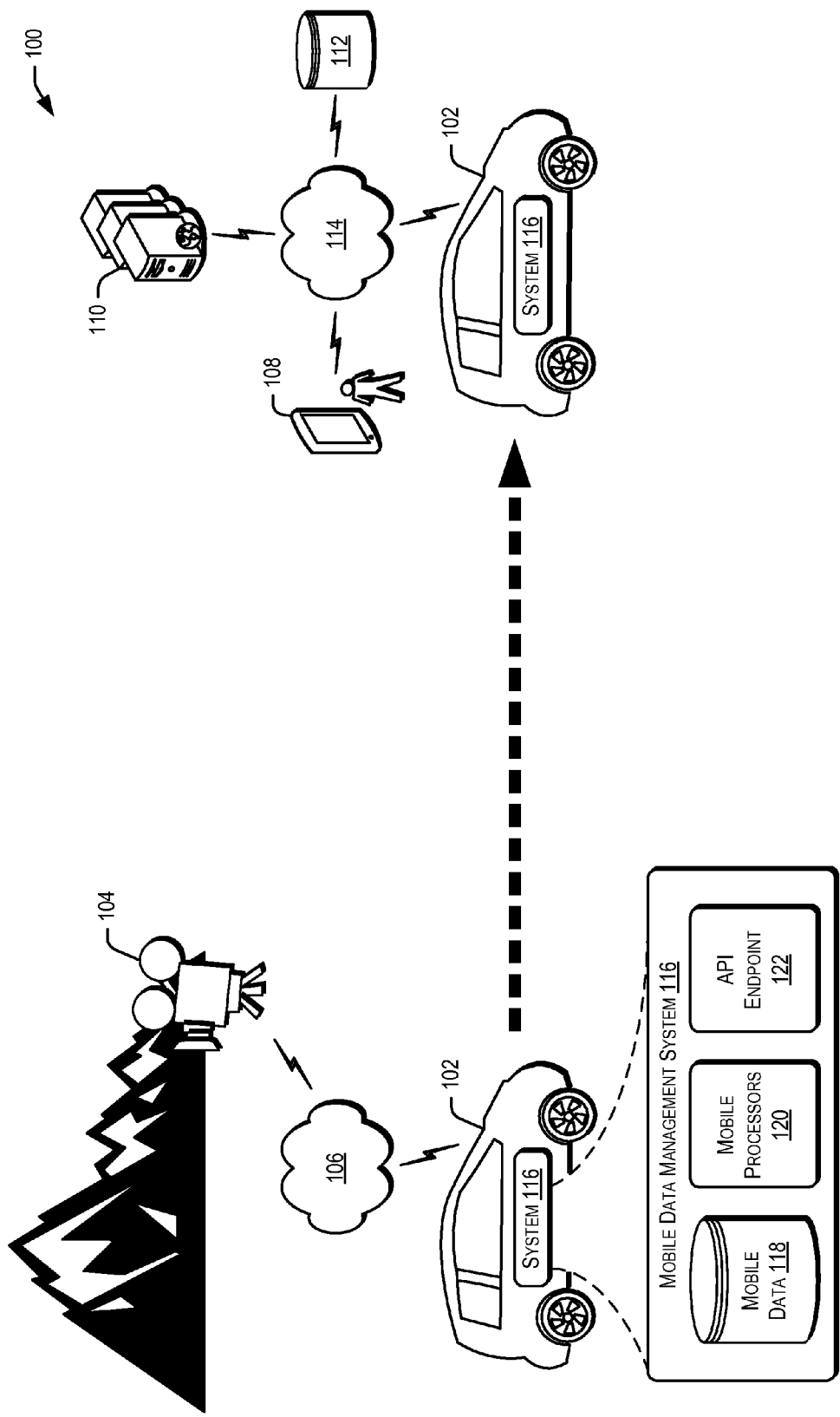
FIG. 1 illustrates an example architecture for implementing the mobile distributed memory system techniques described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing techniques for managing user data within a mobile component of a distributed computing environment. In some examples, the mobile component of the distributed computing environment may be housed within a vehicle (e.g., an electric or hybrid automobile) and may be fully-integrated as part of a larger integrated, distributed computing environment. Additionally, the mobile component may be configured as its own self-defined geographic location of distributed resources of the larger integrated, distributed computing environment. For example, the larger environment may be configured with distributed resources at different geographic locations (e.g., North America, Asia, Europe, etc.). The ability to rely on resources in different locations may enhance data security, data redundancy, and/or network congestion concerns. As such, the mobile component may provide the ability to have additional distributed resources of the distributed environment deployed or otherwise sent to locations where resources don't currently exist or where resources or scarce, inadequate, and/or expected to be needed.

In some examples, the mobile component may also be described as a mobile distributed memory system and/or or a mobile distributed processing system. In either case, or in both cases, the mobile component may be configured to receive data uploaded by one or more users, clients, and/or customers of the larger distributed computing environment or of a third-party service provider that may purchase or otherwise request the use of one or more mobile components. By way of example only, some mobile distributed memory systems may receive this user data as a parameter of, or otherwise communicated by, an application programming interface (API) method call performed or otherwise transmitted by the users. Additionally, in some examples, the API method calls may be based at least in part on the representational state transfer (REST) protocol or other appropriate web-based protocols. Further, the RESTful API calls or other type of API calls performed by the users may be provided or otherwise generated by the larger integrated, distributed computing environment as opposed to the mobile system. In this way, when a user performs one or more of the API calls to upload or otherwise manage the data being sent to the mobile system, the user may think or otherwise intend for the data to be provided to the larger system. However, in other examples, the APIs may be generated and/or provided by the mobile systems. As such, the API may be specific to a web service or other distributed system accessible over the web. When a user utilizes the mobile system, the user may communicate the data via the API of the web service or other distributed system. In other words, the mobile system may act as the web service from the standpoint of communication with the user.

In some aspects, a user or user computing device may perform an API call that may include (e.g., as a parameter of the method) the user data to be stored and/or managed by the mobile system and/or the larger distributed system. By this functionality, the data may be uploaded to the mobile system. Additionally, in some examples, this data upload may occur at a remote location different than that of the larger distributed system and/or at a location that is geographically remote from any public network connections (e.g., the Internet). As such, the user or user computing device may not be able to access the Internet or other network connection for uploading the data to the distributed computing system. Alternatively, in other examples, the user may have access to a network connection, but the amount of data may be too large to utilize such network connections to upload the data. As such, in some examples, the user may interact with otherwise connect to the mobile system as if the mobile system were a "live" location of the larger distributed system, even when the mobile system is not connected to a network (other than that of the user). The data may be uploaded to the mobile system while at the remote location. The mobile system may then travel (e.g., drive, fly, etc.) to a second location where a public network connection may be available and/or where a direct connection to the larger distributed system may be available. Once connected to the network, the mobile system may sync or otherwise upload the data stored therein with the larger distributed computing system.

FIG. 1 depicts an illustrative architecture 100 in which techniques for the mobile distributed memory system discussed herein may be implemented. These techniques are described in more detail below in connection with at least FIGS. 2-6. Returning to FIG. 1, the illustrative architecture 100 includes at least one mobile computing system 102 accessible by one or more remote devices 104 over one or more networks 106. Additionally, the mobile computing system 102 may also be accessible to one or more user devices 108, one or more distributed computing devices (e.g., cloud servers, machine instances, or the like) 110, and/or one or more network storage devices 112 over one or more different networks 114. By way of example only, the distributed computing devices 110 may provide websites, web services, and/or distributed computing resources that may include client instances (e.g., virtual computing systems), data centers, web servers, or the like. In some examples, a website of the distributed computing devices 110 may provide data storage and/or management for users, customers, and/or clients of a distributed system corresponding to the distributed computing devices 110 (e.g., users associated with the one or more remote devices 104.

In some examples, the networks 106 and/or the networks 114 may include any one or a combination of many different types of networks, such as cable networks, the Internet, wireless networks, cellular networks, and other private and/or public networks. While the illustrated example represents the devices 104, 108, 110, 112 accessing the mobile computing system 102 over the networks 106 and/or the networks 114, the described techniques may equally apply in instances where the devices 104, 108, 110, 112 interact with the mobile computing system 102 wirelessly, using fiber optics, or any other communication type, or in any other manner. It is also noted that the described techniques may apply in other client/server arrangements (e.g., set-top boxes, etc.), as well as in non-client/server arrangements (e.g., locally stored applications, etc.). Additionally, in some examples, the networks 106 may be located and/or accessible at different geographic locations and/or via different connections that the networks 114. For example, devices connected via the networks 106 may not be directly or indirectly accessible to devices connected via the networks 114.

In some examples, remote devices 104 may include any user device at a physical location separate from that of the distributed computing devices 110. However, in other examples, the remote devices 104 may be near or at the same location of the distributed computing devices 110, but may be remote in that they are not connected to the networks 114 and/or the distributed computing devices 110. The remote devices 104 may also be any type of computing devices such as, but not limited to, audio recording devices, video recording devices, mobile, desktop, thin-client, virtual, and/or cloud computing devices, and/or any other type of data collection or transmission device. For example, the remote devices 104 may include digital or other types of cameras (e.g., on a movie production set). In one non-limiting example, the location of the movie production set may be located in the mountains at a remote location that is not near any network connectivity. Further, some modern cameras may record data at extremely high rates and/or using extremely high resolution. Thus, the data associated with some film productions may be too large to upload utilizing traditional Internet connections. However, the camera or other remote device 104 associated with the camera may be configured to communicate with one or more web services or other distributed computing system for uploading the data. As such, in some examples, the remote devices 104 may communicate with a mobile computing system 102 to upload the movie data as if the remote device 104 were actually connected to the web service or other cloud service via some direct or indirect network connection (e.g., the Internet). For example, a remote device 104 may perform one or more RESTful API calls that cause camera data from the remote movie production set to be provided to the mobile computing system 102.

In some aspects, the mobile computing system 102 may be housed within a vehicle (e.g., an electric or hybrid automobile) and may include any type of computing devices such as, but not limited to, mobile, desktop, thin-client, virtual, and/or cloud computing devices. In some examples, the mobile computing system 102 may be in communication with the remote devices 104 as noted above via the networks 106, or via other network connections. The mobile computing system 102 may include one or more computing resources, perhaps arranged in a cluster, as a server farm, as individual servers not associated with one another, or not as servers at all (e.g., as virtual computing devices). These resources may be configured to perform the mobile distributed data management as part of an integrated, distributed computing environment within the vehicle and/or along with the other distributed computing devices 110 (e.g., once connected to the networks 114). Additionally, the mobile computing system 102 may include (e.g., stored in memory and executable by one or more processors) a mobile data management system 116 that at least includes a network of computing resources that are collectively configured to operate the mobile data management as described herein. The mobile computing system 102 may also include a propulsion device (such as an electric motor or a combustion engine). In some aspects, the combustion engine may be powered by gasoline, natural gas, or any other type of fuel. Additionally, the propulsion device may be configured to provide power for powering the vehicle and/or the mobile data management system 116. The mobile computing system 102 may also be configured to provide data storage redundancy similar to that of the distributed computing devices 110. In this way, if one storage device of the mobile computing system 102 goes down or otherwise becomes inoperable, a user's data is not lost as it will have already been backed-up on another storage device of the mobile computing system 102.

More specifically, in some examples, the mobile data management system 116 may be supported by a mobile data store 118, one or more mobile processors 120, and/or an API endpoint module 122. As used herein, modules may refer to programming modules executed by servers or clusters of servers that are part of a service. In this particular context, the modules may be executed by the servers or clusters of servers that are part of the mobile data management system 116. The mobile data store 118 may be configured to store or otherwise manage user data and/or data received from the remote devices 104. For example, the mobile data store 118 may store or otherwise manage the movie data or other data being collected or previously collected by the remote devices 104 (e.g., under-sea seismic analysis data, datacenter migration data, or the like). In some examples, the mobile processors 120 may include any number and/or type of computing processors, machine instances, or the like that may be configured to perform instructions for implementing the mobile data management system 116. Additionally, the mobile processors 120 may be configured to manage the receipt of the user data from the remote devices 104 and/or cause storage of the user data in the mobile data store 118. Further, in some examples, the API endpoint module 122 may be configured to manage remotely called APIs (e.g., those performed by the remote devices 104 or other devices such as, but not limited to, the user devices 108 and/or the distributed computing devices 110. The API endpoint 122 may also be configured to cause the processors 120 to perform data receipt, data storage, and/or data providing based at least in part on the remotely called APIs (e.g., without the remote devices 104 utilizing Internet Protocol addresses).

In one non-limiting example, the mobile computing system 102 may be configured to receive user data from the remote devices 104 or other devices at a first location (e.g., the remote film product set or the like). The mobile computing system 102 may then be configured to travel (e.g., to drive) to a second location. The mobile computing system 102 may be driven by a driver, may be configured with a remote control system, and/or may automatically (e.g., without a driver and without a user operating a remote controller) travel to the second location. In some cases, the second location may be a location where network connectivity is available (e.g., a location with wired or wireless access to the networks 114). Additionally, the second location may be a colocation facility physically coupled with the distributed computing devices 110 or other service provider computers (e.g., via a private connection, a wired connection, or the like). Once the mobile computing system 102 has traveled to the second location, the mobile computing system 102 may be configured to upload the user data stored in the mobile data store 118 to one or more computing devices. For example, the user data may be provided to the distributed computing devices 110, to another user device 108, and/or to a network storage device 112 (e.g., associated with the distributed computing devices 110). In this way, the user data may be able to backed-up or otherwise stored at the network storage 112 or other storage devices associated with the distributed computing devices 110 even when the user and/or remote computers 104 are collecting data in locations without network connectivity. Additionally, in some examples, the mobile computing system 102 may be synced with other mobile systems or the like of the distribute computing devices 110 as if the mobile computing system 102 went down (e.g., based at least in part on a power failure or other loss of operability) and was now reconnecting to the integrated, distributed system. Further, the uploading of the user data and/or the syncing of user data to the distributed computing devices 110 may be accomplished by way of RESTful API calls made by the mobile computing system 102, similar to those utilized by the remote computers 104.

Figure 2:
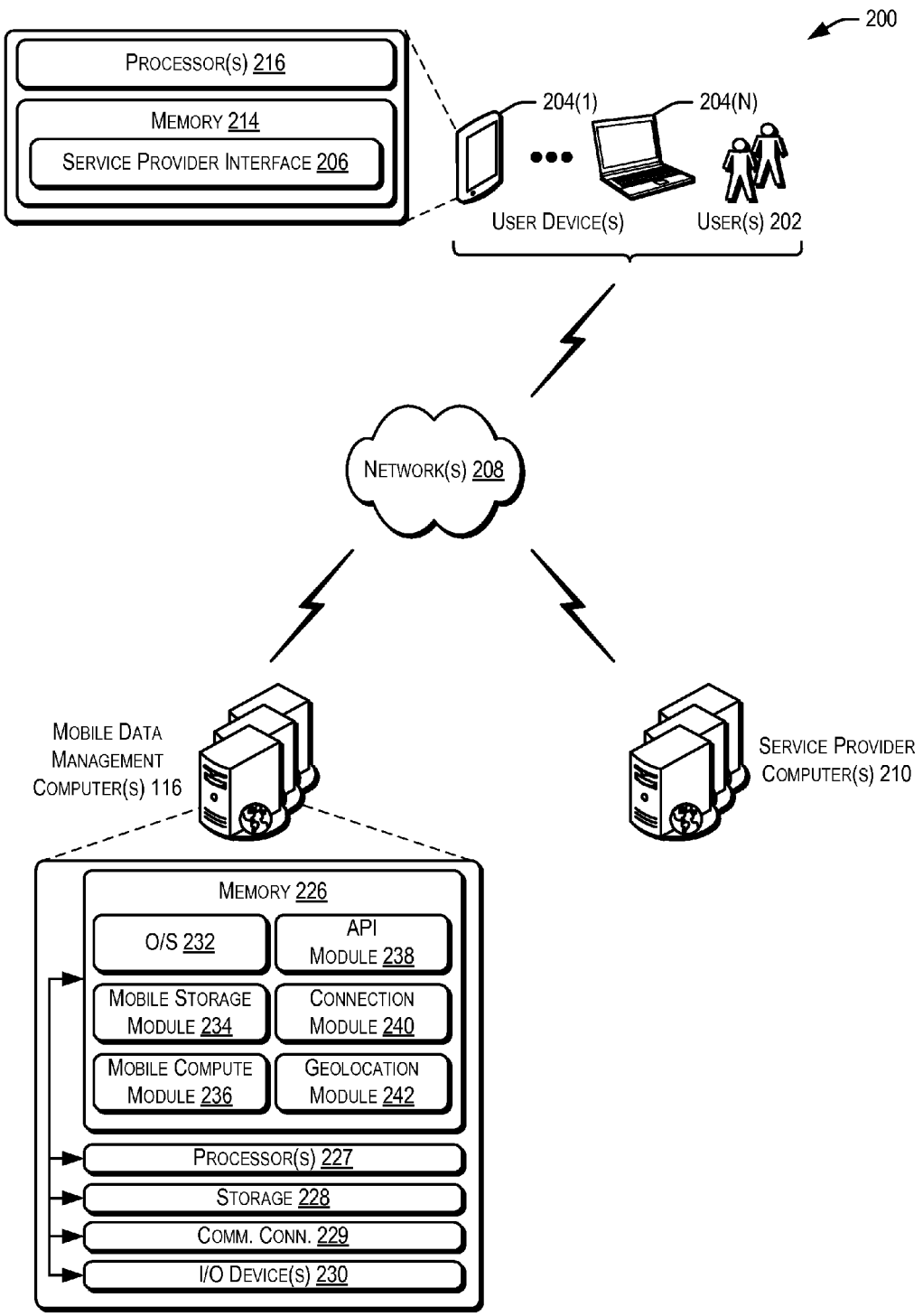
FIG. 2 illustrates another example architecture for implementing the mobile distributed memory system techniques described herein, according to at least one example.

FIG. 2 depicts an illustrative system or architecture 200 in which techniques for mobile data management may be implemented. In architecture 200, one or more customers and/or users 202 (e.g., users at remote locations and/or users with large amounts of data) may utilize user computing devices 204(1)-(N) (collectively, "user devices 204) similar to the remote devices 104 as described with reference to FIG. 1 to access a service provider interface 206, or a user account accessible through the service provider interface 206, via one or more networks 208. In some aspects, the service provider interface 206 and/or user account may be hosted, managed, and/or otherwise provided by a computing resources service or service provider, such as by utilizing one or more service provider computers 210 similar to the distribute computers 110 as described with reference to FIG. 1. The one or more service provider computers 210 may, in some examples, provide computing resources such as, but not limited, web hosting, client entities, data storage, data access, management, virtualization, etc. In some aspects, a processing entity may be virtual and/or data volumes may be stored virtually within a distributed computing system operated by the one or more service provider computers 210. The one or more service provider computers 210 may also be operable to provide network storage, web hosting, email hosting, online catalogs, product reviews, combinations of the foregoing, or the like to the one or more users 202. Additionally, in some examples, the user devices 204 may also access the mobile data management computers 116 of FIG. 1 (e.g., as part of communicating with a vehicle 102) via the networks 208.

In some examples, the networks 208 may include any one or a combination of many different types of networks, such as cable networks, the Internet, wireless networks, cellular networks, and other private and/or public networks. While the illustrated example represents the users 202 accessing the mobile data management computers 116 and/or the service provider computers 210 over the networks 208, the described techniques may equally apply in instances where the users 202 interact with mobile data management computers 116 and/or the service provider computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, mobile applications, etc.).

As described briefly above, the service provider interface 206 may allow the users 202 to interact with the mobile data management computers 116 and/or the service provider computers 210, such as to store, access, and/or manage data of the users 202. The one or more service provider computers 210, perhaps arranged in a cluster of servers or as a server farm, may host the service provider interface 206. Other server architectures may also be used to host the service provider interface 206. The service provider interface 206 may be capable of handling requests from many users 202 and serving, in response, various user interfaces that can be rendered at the user devices 204. The service provider interface 206 can access and/or render any type of website that supports user interaction, including social networking sites, online retailers, informational sites, blog sites, search engine sites, news and entertainment sites, and so forth. As discussed above, the described techniques can similarly be implemented outside of the service provider interface 206, such as with other applications running on the user devices 204.

As noted above, the architecture 200 may include one or more user devices 204. The user devices 204 may be any type of computing device such as, but not limited to, a data collection device, a mobile phone, a smart phone, a personal digital assistant (PDA), a laptop computer, a desktop computer, a thin-client device, a tablet PC, etc. In some examples, the user devices 204 may be in communication with the service provider computers 210 and/or the mobile data management computers 116 via the networks 208, or via other network connections.

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the service provider interface 206. The service provider interface 206 may be configured to receive, store, and/or display a website or other interface for interacting with the mobile data management computers 116 and/or the service provider computers 210. The service provider interface 206 may also be configured to cause the user data to be provided to the mobile data management computers 116 for temporary storage while the mobile data management computers 116 are in transit. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 204.

In some examples, the mobile data management computers 116 may also be any type of computing devices such as, but not limited to, mobile, desktop, thin-client, and/or cloud computing devices, such as servers. In some examples, the mobile data management computers 116 may be housed within a vehicle (e.g., an automobile, a watercraft, an aircraft, or the like) and may be in communication with the user devices 204 and/or the third-party service provider computers 210 via the networks 208, or via other network connections. The mobile data management computers 116 may include one or more servers, perhaps arranged in a cluster, as a server farm, or as individual servers not associated with one another. These servers may be configured to host a website (or combination of websites) viewable via the user devices 204 or a web browser (or service provider interface) accessible by a user 202. Additionally, in some aspects, the mobile data management computers 116 may be configured to perform the mobile data management techniques described herein, as part of an integrated, distributed computing environment.

In one illustrative configuration, the mobile data management computers 116 may include at least one memory 226 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The memory 226 may store program instructions that are loadable and executable on the processor(s) 227, as well as data generated during the execution of these programs. Depending on the configuration and type of mobile data management computers 116, the memory 226 may be volatile (such as RAM) and/or non-volatile (such as ROM, flash memory, etc.). The mobile data management computers 116 or servers may also include additional storage 228, which may include removable storage and/or non-removable storage. The additional storage 228 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 226 may include multiple different types of memory, such as SRAM, DRAM, or ROM.

The memory 226, the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 226 and the additional storage 228 are all examples of computer storage media. Additional types of computer storage media that may be present in the mobile data management computers 116 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the mobile data management computers 116. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The mobile data management computers 116 may also contain communications connection(s) 229 that allow the mobile data management computers 116 to communicate with a stored database, another computing device or server, user terminals and/or other devices on the networks 208. The mobile data management computers 116 may also include I/O device(s) 230, such as a keyboard, a mouse, a pen, a voice input device, a touch input device, a display, speakers, a printer, etc.

Turning to the contents of the memory 226 in more detail, the memory 226 may include an operating system 232 and/or one or more application programs or services for implementing the features disclosed herein including a mobile storage module 234, a mobile compute module 236, an API module 238, a connection module 240, and/or a geolocation module 242. In some examples, the mobile storage module 234 may be configured to manage temporary storage of user data while the mobile data management computers 116 are in transit to a second location. In some aspects, the mobile compute module 236 may be configured provide remote computing power (e.g., machine instances or physical processors) to the mobile data management computers 116 (e.g., for performing remote computation of the data managed by the mobile storage module 234. In this way, the mobile data management computers 116 may process or otherwise provide virtual processing to users 202 that request cloud computing resources to process data at remote locations and/or during conventions where multiple users may request local and/or powerful data processing.

In some examples, the API module 238 may be configured to manage API method calls (e.g., based at least in part on the REST protocol) performed by the user devices 204 and/or the service provider computers 210. Additionally, the API module 238 may also be configured to receive data from the user devices 204 based at least in part on the API method calls performed by the user devices 204. For example, user data may be received as an attribute of one or more RESTful API method calls performed by the user devices 204. Additionally, in some examples, the connection module 240 may be configured to manage network connections of the mobile data management computers 116. For example, the connection module 240 may be configured to determine which networks are available and when. Additionally, the connection module 240 may also be configured to connect to particular networks when in range or otherwise available. For example, when the mobile data management computers 116 physically connects to a port or other connection type of a colocation device or location associated with the one or more service provider computers 210, the connection module 240 may automatically establish a connection therewith. Further, in some examples, the geolocation module 242 may be configured to store and/or manage geolocation information associated with the mobile data management computers 116 (e.g., a geographic location of the vehicle 102 or other device that houses the mobile data management computers 116. In some examples, the geolocation information managed by the geolocation module 242 may be utilized to determine what data to store, when to provide the data to the service provider computers 201, and/or when to connect to which networks.

In some cases, a user 202 may request to upload or otherwise store data with the mobile data management computers 116. As such, the user may perform one or more RESTful (or other types of) API calls that include the user data to be stored as an attribute of the API. As such, even if the user devices 204 are not connected to the Internet, they may act as if they are with respect to the mobile data management computers 116. Upon receipt of this user data, the mobile data management computers 116 may store the user data (e.g., utilizing the mobile storage module 234) for a particular amount of time. In some cases, the amount of time may be based at least in part on how long it takes to upload and/or store all of the requested data and/or how long it takes to travel to a second location (e.g., where the service provider computers 210 are physically accessible via a direct connection or via one or more network connections). The mobile data management computers 116 may then travel to a second location and connect to one or more networks for accessing the service provider computers 210. The user data may then be provided to the service provider computers 210 (e.g., also utilizing RESTful or other API methods) by the mobile data management computers 116.

Additionally, in some examples, a service provider or other entity may request to provide content to users that may not have Internet access and/or may be congested in an area of incidence (e.g., at a convention or technology fair). In this way, the mobile data management computers 116 may store the content provider data utilizing at least the mobile storage module 234 and may be configured to provide such data to multiple different user devices (e.g., the user devices 204) directly (e.g., via direct connection to the mobile data management computers 116) as if the user devices 204 were actually connected to the Internet or some other network. In this way, large amounts of data and/or high resolution data may be shared among a large number of users in a particular area with less security and/or bandwidth issues.

A few additional examples of the operations of the mobile data management computers 116 and/or the service provider computers 210 are also described in greater detail below with reference to FIGS. 3-7.

Figure 3:
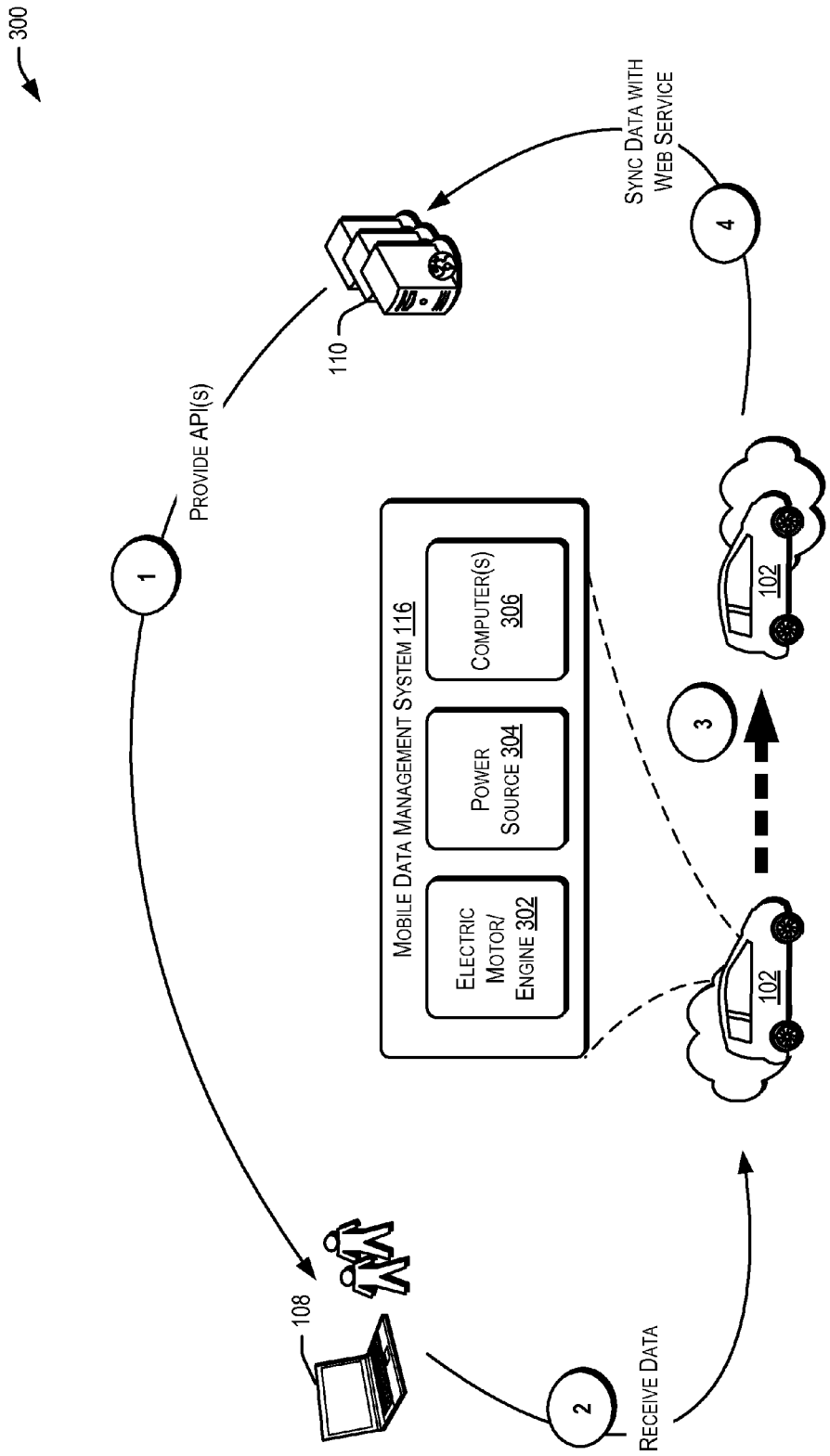
FIG. 3 illustrates an example flow diagram of techniques for implementing features of the mobile distributed memory system described herein, according to at least one example.

FIG. 3 illustrates another example flow diagram showing one or more techniques 300 for mobile data management, as described herein. While techniques 300 are shown in FIG. 3 in a particular order (including arbitrary sequence numbers), it should be understood that no particular order is necessary and that one or more steps or parts of the techniques 300 may be omitted, skipped, and/or reordered. In at least one non-limiting example, one or more distributed computers 110 (e.g., as describe with reference to FIG. 1) may provide one or more API method calls to one or more user devices 108 (e.g., as described with reference to FIG. 1). These API methods may be utilized for communicating with and/or making requests to directly to the distributed computers 110. For example, the distributed computers 110 may provide a RESTful "post" API for causing storage of the user data with the distributed computers 110. Additionally, the one or more mobile data management computers 116 described above with reference to FIGS. 1 and 2 may then receive user data from the user devices 108 based at least in part on the APIs provided by the distributed computers 110 (and, in some examples, at a first location that may not have access to the distributed computers 110). The distributed computers 110 and/or the mobile data management computers 116 may also provide one or more instructions, command line utilities, and/or software utilities for changing a configuration of the user devices 108 such that the user devices 108 may connect with the mobile data management computers 116 as if they were the distributed computers 110.

As noted above, the vehicles 102 may house or otherwise be coupled with the mobile data management system 116. Additionally, the mobile data management system 116 may include a propulsion device 302 such as, but not limited to, an electric motor and/or an engine, a power source 304 (e.g., a battery), and/or one or more computing resources 306 (e.g., the mobile data store 118 and/or the mobile processors 120 of FIG. 1). In some aspects, the vehicle 102 may travel from a first location to a second location. The first location may or may not have network connection availability (or than the ability to connect to the user devices 108). Once the vehicle 102 arrives at the second location and/or connects to a network accessible by the distributed computers 110, the mobile data management system 116 may be configured to upload and/or sync the user data of the computing resources 306 with the distributed computers 110. In some aspects, the distributed computers 110 may host or otherwise manage one or more web services (e.g., a cloud environment or the like) for storing, managing, and/or processing user data on behalf of a user. Additionally, the vehicle 102 may also include cooling, battery recharging capabilities, API endpoint servers, other power sources, and/or network interconnect gear. The mobile data management system 116 may also be configured to support hundreds, thousands, or more simultaneous data writes. Further, in some examples, the vehicles 102 may be utilized to aid in congestion control and/or load balancing by driving to locations that are experiencing high congestion and/or balancing issues. When the vehicle, arrives at the new location, it may be automatically and almost immediately implemented as a new set of distributed resources in that location. Further, the vehicles 102 may also be utilized to mitigate potential disasters by driving to safer locations (e.g., higher ground, away from meteor impact zones, etc.) when disasters are predicted. Grid-independent power and/or relocation of the distributed computing resources to a location with a working Internet connection may also be realized by utilization of the vehicles 102. In some aspects, a user may configure or pre-configure (e.g., using one or more templates) the vehicles 102 so that the vehicles 102 arrive ready to perform particular tasks or able to perform particular types of tasks. For example, the user may pre-configure a vehicle 102 that includes five hosts, to have three hosts set for storage and two hosts set for processing (e.g., as machine images).

Additionally, in some examples, the distributed computers 110 and/or a service provider (e.g., a web service or group of web services) associated with the distributed computers 110 may charge users of the user devices 108 for utilizing the mobile data management system 116 and/or a vehicle 102 that includes a mobile data management system 116. For example, a fee may be charged for leasing or buying the vehicle 102 (e.g., including delivery, paying for a driver, paying for gas, paying for miles driven, etc.) and/or for utilizing the mobile data management system 116 (e.g., based at least in part on actual usage or expected usage, based at least in part on an amount of data being stored or to be stored, and/or based at least in part on an amount of throughput or bandwidth needed to receive the data). In some cases, a flat fee may be charged for establishing a network connection with the vehicle 102 and/or with the distributed computers 110. There may be hourly rates associated with uploading, downloading, importing, and/or exporting rates and/or amounts of data as well as hourly rates associated with possession (including transit time in some examples) of the vehicle 102. Hourly rates may also apply to services associated with the mobile data management system 116 including, but not limited to, a driver, a service technician, a service team, connection hardware, etc.

Figure 4:
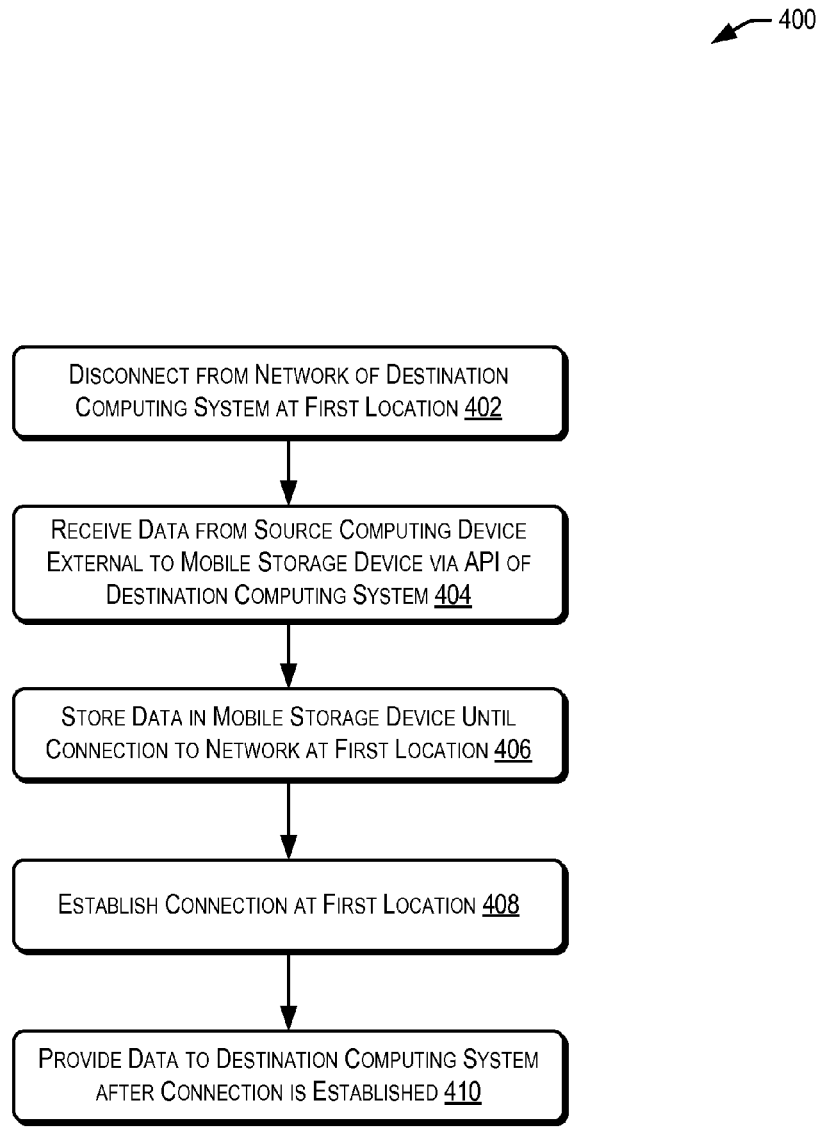
FIG. 4 illustrates an example flow diagram of a process for implementing the mobile distributed memory system techniques described herein, according to at least one example.
Figure 5:
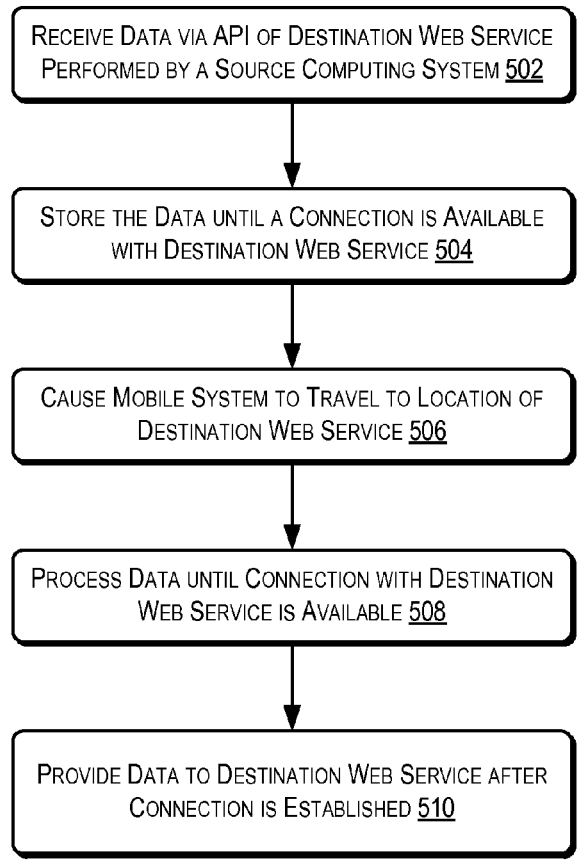
FIG. 5 illustrates another example flow diagram of a process for implementing the mobile distributed memory system techniques described herein, according to at least one example.

FIGS. 4 and 5 illustrate example flow diagrams showing respective processes 400 and 500 for implementing mobile data management. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the mobile data management system 116 shown in FIG. 1 may perform the process 400 of FIG. 4. The process 400 may begin by including disconnection of a mobile data center from a network connection of a destination computing system at a first location at 402. In some examples, the destination computing system may be a web service or other service provider. Additionally, the first location may be any location where the web service or destination computing system is accessible via one or more network connections and may not be limited to the physical location of the computers associated with the system itself. At 404, the process 400 may include receiving data from a source computing device external to the mobile data center. The data may be communicated to the mobile data center via an API of the destination computing system. Additionally, in some examples, the API may be generated and/or provided by the destination computing system. At 406, the process 400 may include storing the data in the mobile data center until a connection to a network at the first location is available. The process 400 may also include establishing a connection at the first location at 408. In some examples, the process 400 may end, at 410, by including providing the data to the destination computing device after the connection is established.

FIG. 5 illustrates an example flow diagram showing process 500 for implementing mobile data management. The mobile data management system 116 shown in FIG. 1 may perform the process 500 of FIG. 5. The process 500 may begin by including receiving, at a mobile data center, data via an API of a destination web service at 502. The API calls may be performed by a source computing system. At 504, the process 500 may include storing the data until a connection is available with the destination computing system. At 506, the process 500 may include causing the mobile data center to travel to a location of the destination computing system. As noted above, in some examples, the location of the destination computing system may be a destination of a network connection that enables access of the destination computing system. In other words, the location of the location of the destination computing system may not actually be a location where the destination computing system physical exists. At 508, the process 500 may include processing the data until a connection with the destination computing is available or accessible. Further, in some examples, the process 500 may end, at 510, by including providing the data to the destination computing system after a connection is established.

Illustrative methods and systems for implementing dynamic network mirroring are described above. Some or all of these systems and methods may, but need not, be implemented at least partially by architectures and processes such as those shown at least in FIGS. 1-5 above.

Figure 6:
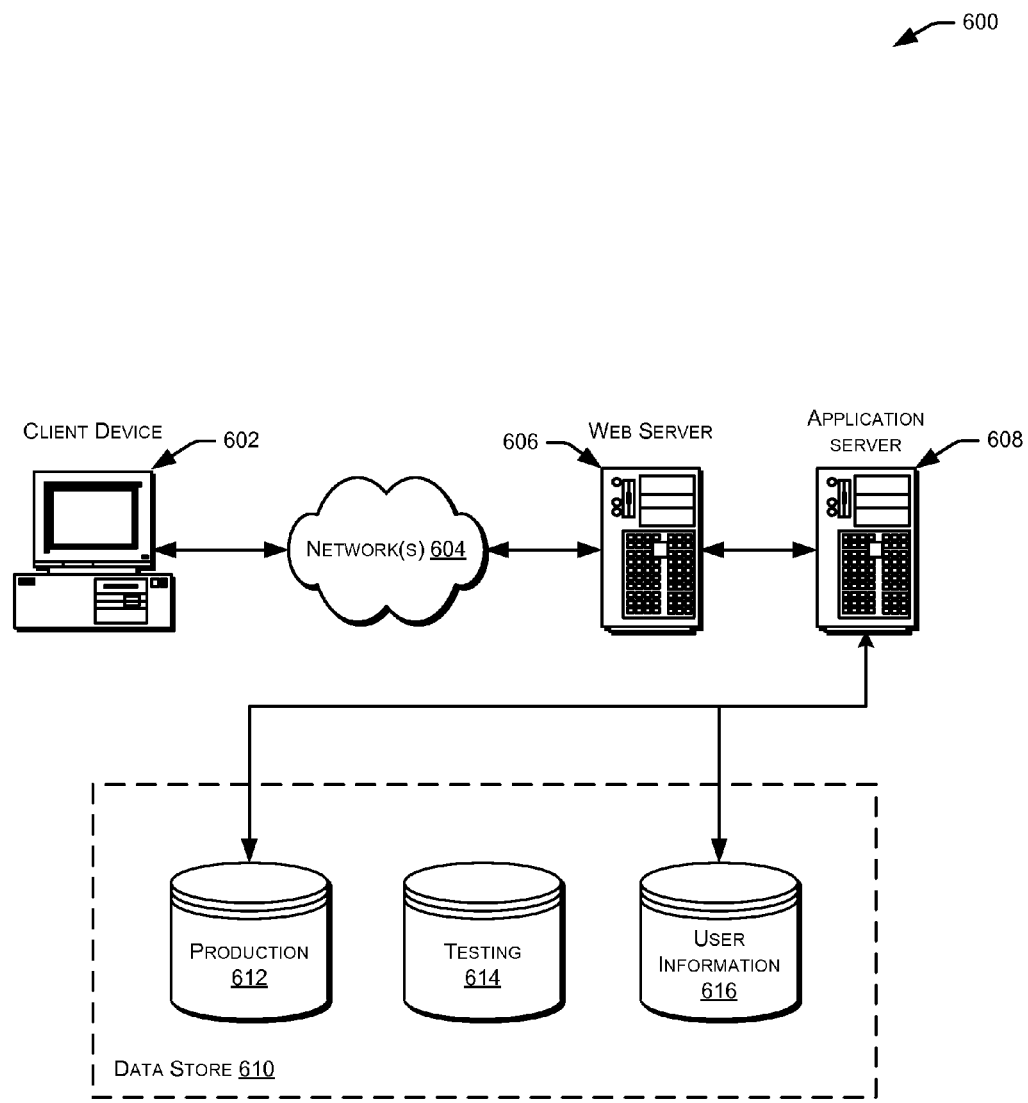
FIG. 6 illustrates an environment in which various embodiments of the mobile distributed memory system techniques described herein can be implemented, according to at least one example.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The invention claimed is:

1. A vehicle for enabling mobile data management, the vehicle comprising:
 a propulsion system configured to enable travel of the vehicle from a first location, that is geographically remote from any public network connections, to at least a second location at a time after completion of a data storage project, the second location corresponding to a web service system with an application programming interface;
 at least one memory that stores computer-executable instructions and is configured to store data generated by an external computing system at the first location; and
 at least one processor configured to access the at least one memory, wherein the at least one processor is configured to execute the computer-executable instructions to collectively at least:
 receive, while at the first location, the data from the external computing system via the application programming interface of the web service system;
 cause the data to be stored in the at least one memory based at least in part on a first application programming interface call of the application programming interface; and
 cause transmission of the data to the web service system, based at least in part on a second application programming interface call of the application programming interface, at a time after the vehicle has traveled to the second location.

2. The vehicle of claim 1, wherein at least one of the first application programming interface call or the second application programming interface call is a representational state transfer application programming interface call.

3. The vehicle of claim 1, wherein the data storage project corresponds to a request to store the data to or retrieve the data from the web service system, the request identified by at least one of the first application programming interface call or the second application programming interface call.

4. The vehicle of claim 1, wherein the data from the external computing system is communicated by at least one of the first application programming interface call or the second application programming interface call.

5. The vehicle of claim 1, further comprising a power source system configured to enable operation of the propulsion system and the at least one processor.

6. The vehicle of claim 1, wherein the propulsion system includes at least an electric motor or an engine.

7. A system for enabling mobile data management, comprising:
   at least one memory that stores computer-executable instructions; and
   at least one processor configured to access the at least one memory, wherein the at least one processor is configured to execute the computer-executable instructions to collectively at least:
   receive, from at least one external source located at a first location, data intended for a web service system located at a second location, the data received via an application programming interface of the web service system, wherein the system is disconnected from all networks other than a network of the at least one external source while receiving the data intended for the web service system;
   cause storage of the data in the at least one memory while at the first location;
   establish a connection with the web service system while at the second location; and
   based at least partly on an application programming interface call provided by the application programming interface, provide the data to the web service system while at the second location.

8. The system of claim 7, further comprising a vehicle configured to be coupled with the at least one memory and the at least one processor.

9. The system of claim 8, wherein the vehicle is configured to travel from the first location to the second location at a time after storing the data in the at least one memory.

10. The system of claim 7, wherein the application programming interface call is a representational state transfer application programming interface call.

11. The system of claim 10, wherein the at least one processor is further configured to execute the computer-executable instructions to collectively at least cause the web service system to provide the representational state transfer application programming interfaced to the at least one external source.

12. The system of claim 7, wherein the at least one processor is further configured to execute the computer-executable instruction to collectively at least establish a direct connection to the web service system upon arriving at the second location.

13. A computer-implemented method for enabling mobile data management, comprising:
   under control of one or more computer systems configured with executable instructions,
   receiving, at a mobile storage device configured to travel between a first location and a second location, data from a source computing system that is external to the mobile storage device via an application programming interface of a destination computing system, wherein the source computing system and the mobile storage device are both located at the second location during the receiving;
   storing the data in the mobile storage device at least until the mobile storage device connects to a network of the destination computing system at the first location;
   establishing a connection, by the mobile storage device, with the network of the destination computing system at a time after traveling from the second location to the first location; and
   based at least partly on an application programming interface call provided by the application programming interface, providing, by the mobile storage device, the data to the destination computing system at a time after the mobile storage device establishes the connection.

14. The computer-implemented method of claim 13, further comprising disconnecting from a previous connection to the network of the destination computing system at the first location prior to receiving the data.

15. The computer-implemented method of claim 13, wherein the mobile storage device is a vehicle housing the one or more computer systems, the vehicle including at least an electric motor and a battery configured to power at least one of the electric motor or the one more computer systems.

16. The computer-implemented method of claim 13, wherein the source computing device and the mobile storage device are both geographically remote from any public network connections while located at the second location.

17. The computer-implemented method of claim 13, wherein the source computing system includes at least a data collection entity.

18. The computer-implemented method of claim 17, wherein the destination computing system includes at least a web service entity.

19. The computer-implemented method of claim 13, wherein the source computing system includes at least a service provider.

20. The computer-implemented method of claim 19, wherein the destination computing system includes at least a user device configured to consume the data.

21. A computer-implemented method for enabling mobile data management, comprising:
   under control of one or more computer systems configured with executable instructions,
   receiving, at a mobile computing system, data communicated by a first web service application programming interface call performed by a source computing system, the web service application programming interface call corresponding to a destination web service;
   storing the data in the mobile computing system at least until a connection is available with the destination web service;
   causing the mobile computing system to travel to a location of the destination web service that is different than a location of the source computing system; and
   based at least partly on a second web service application programming interface call performed by the source computing system, providing, by the mobile computing system, the data to the destination web service at a time after the mobile computing system establishes a connection with the destination web service at the location of a network of the destination web service.

22. The computer-implemented method of claim 21, further comprising processing the data, by the mobile computing system, at least until the connection is available with the destination web service.

23. The computer-implemented method of claim 21, wherein the mobile computing system is configured to be integrated with a self-propelled vehicle.

24. The computer-implemented method of claim 21, wherein the web service application programming interface call is a representational state transfer web service application programming interface call provided by the destination web service.

* * * * *